US011834122B2

(12) United States Patent
Tetsuka et al.

(10) Patent No.: US 11,834,122 B2
(45) Date of Patent: Dec. 5, 2023

(54) STRADDLE TYPE VEHICLE

(71) Applicant: HONDA MOTOR CO., LTD., Tokyo (JP)

(72) Inventors: Takashi Tetsuka, Wako (JP); Tsubasa Fukuoka, Wako (JP); Hiroaki Uchisasai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 603 days.

(21) Appl. No.: 17/020,786

(22) Filed: Sep. 14, 2020

(65) Prior Publication Data

US 2020/0407001 A1   Dec. 31, 2020

Related U.S. Application Data

(63) Continuation of application No. PCT/JP2018/012932, filed on Mar. 28, 2018.

(51) Int. Cl.
*B62J 3/10* (2020.01)
*B62J 50/22* (2020.01)
*B62J 45/41* (2020.01)

(52) U.S. Cl.
CPC ............... *B62J 3/10* (2020.02); *B62J 45/41* (2020.02); *B62J 50/22* (2020.02)

(58) Field of Classification Search
CPC ............... B62J 3/10; B62J 45/41; B62J 50/22
See application file for complete search history.

(56) References Cited

U.S. PATENT DOCUMENTS 9,153,133 B1   10/2015 Lunsford
9,457,753 B2 *  10/2016 Freienstein ............. G01S 13/86
9,799,223 B2 *  10/2017 Nespolo ................. G08G 1/166
(Continued)

FOREIGN PATENT DOCUMENTS

CN   206322324 U   7/2017
JP   07057181 A *  3/1995
(Continued)

OTHER PUBLICATIONS

International Search Report for PCT/JP2018/012932 dated Jun. 5, 2018.
IPRP for PCT/JP2018/012932 mailed May 29, 2020.

*Primary Examiner* — Kevin Hurley
*Assistant Examiner* — Michael R Stabley
(74) *Attorney, Agent, or Firm* — Thomas | Horstemeyer, LLP

(57) ABSTRACT

A straddle type vehicle comprises: a detection unit configured to detect a situation of a detection area on one of a rear side and a lateral side of a self-vehicle; a distance determination unit configured to determine a change in a relative distance between the self-vehicle and another vehicle detected in the detection area and a notification control unit configured to make a notification to a driver based on one of a detection result of the detection unit and a determination result of the distance determination unit. The notification control unit makes the notification by first notification output if the other vehicle is detected in the detection area by the detection unit, and makes the notification by second notification output if it is determined by the distance determination unit that the relative distance to the other vehicle has become short.

7 Claims, 7 Drawing Sheets

(56) References Cited

U.S. PATENT DOCUMENTS

| | | | |
|---|---|---|---|
| 9,802,537 B2 | 10/2017 | Tetsuka et al. | |
| 11,345,279 B2* | 5/2022 | Kopp | B60W 50/16 |
| 2005/0258977 A1* | 11/2005 | Kiefer | G08G 1/16 |
| | | | 340/903 |
| 2010/0073152 A1* | 3/2010 | Nagamine | G08G 1/166 |
| | | | 340/425.5 |
| 2010/0315216 A1* | 12/2010 | Hada | B60Q 1/535 |
| | | | 340/436 |
| 2013/0311075 A1* | 11/2013 | Tran | B60W 50/14 |
| | | | 701/117 |
| 2015/0314783 A1* | 11/2015 | Nespolo | B60W 30/095 |
| | | | 701/301 |
| 2016/0090037 A1 | 3/2016 | Tetsuka et al. | |
| 2017/0162054 A1* | 6/2017 | Nespolo | B60Q 9/008 |

FOREIGN PATENT DOCUMENTS

| | | | |
|---|---|---|---|
| JP | H07-057181 A | | 3/1995 |
| JP | 2009204592 A | | 9/2009 |
| JP | 2010198100 A | * | 9/2010 |
| JP | 2010198100 A | | 9/2010 |
| JP | 2016068606 A | | 5/2016 |
| JP | 2017522681 A | | 8/2017 |
| WO | 2016010689 A1 | | 1/2016 |
| WO | 2019186816 A1 | | 10/2019 |

* cited by examiner

STRADDLE TYPE VEHICLE

CROSS-REFERENCE TO RELATED APPLICATION(S)

This application is a continuation of International Patent Application No. PCT/JP2018/012932 filed on Mar. 28, 2018, the entire disclosures of which is incorporated herein by reference.

BACKGROUND OF THE INVENTION

Field of the Invention

The present invention relates to a straddle type vehicle and, more particularly, to a straddle type vehicle having a function of notifying a driver stepwise of the relative positional relationship with another vehicle in accordance with a driving situation.

Description of the Related Art

PTL 1 discloses a technique of, if a following vehicle is detected, notifying a driver of the existence of the following vehicle by increasing the operation resistance of a turn signal operator.

CITATION LIST

Patent Literature

PTL 1: Japanese Patent Laid-Open No. 2016-68606

However, a vehicle can be steered even if a following vehicle exists. When further approaching the following vehicle, a notification function of notifying further approach is demanded.

SUMMARY OF THE INVENTION

The present invention provides a straddle type vehicle capable of notifying a driver stepwise of the relative positional relationship with another vehicle in accordance with a driving situation.

According to arrangement 1 of the present invention, there is provided a straddle type vehicle (for example, 1) comprising: a detection unit (for example, GS1, GS2) configured to detect a situation of a detection area on one of a rear side and a lateral side of a self-vehicle; a distance determination unit (for example, C11) configured to determine a change in a relative distance between the self-vehicle and another vehicle detected in the detection area; a notification control unit (for example, C12) configured to make a notification to a driver based on one of a detection result of the detection unit (GS1, GS2) and a determination result of the distance determination unit (C11); a movement determination unit (for example, C13) configured to determine movement of the self-vehicle in a vehicle width direction; and a display unit (for example, 15) configured to display a notification output of the notification control unit (C12), wherein the notification control unit (C12) makes the notification by first notification output if the other vehicle is detected in the detection area by the detection unit (GS1, GS2) (for example, S31, S32 of FIG. 3, FIG. 4), makes the notification by second notification output if it is determined by the distance determination unit (C1) that the relative distance to the other vehicle has become short (for example, S33, S34 of FIG. 3, FIG. 5), and makes the notification by third notification output if the self-vehicle moves in the vehicle width direction by determination of the movement determination unit (C13), the display unit (15) includes a plurality of notification display regions (74L, 74R, 74B) in which display portions (71L, 71R, 71B) of the first notification output, display portions (72L, 72R, 72B) of the second notification output, and display portions (73L, 73R) of the third notification output are arranged, and each of the plurality of notification display regions (74L, 74R, 74B) is arranged at a position representing a detection area on one of the rear side and the lateral side of the self-vehicle.

In the straddle type vehicle (1) of arrangement 2 of the present invention, the notification control unit (C12) further makes the notification based on a determination result of the movement determination unit (C13).

In the straddle type vehicle (1) of arrangement 3 of the present invention, the notification control unit (C12) makes the notification by the third notification output if the self-vehicle moves in the vehicle width direction by the determination of the movement determination unit (C13) after the notification by the first notification output and before the notification by the second notification output (for example, S35, S36 of FIG. 3, FIG. 6).

In the straddle type vehicle (1) of arrangement 4 of the present invention, the notification control unit (C12) makes the notification by the third notification output if the self-vehicle moves in the vehicle width direction by the determination of the movement determination unit (C13) after the notification by the second notification output.

The straddle type vehicle (1) of arrangement 5 further comprises a type determination unit (for example, C14) configured to determine a type of the other vehicle based on the detection result of the detection unit (GS1, GS2), wherein the notification control unit (C12) changes the first notification output in accordance with a determination result of the type determination unit (C14).

In the straddle type vehicle (1) of arrangement 6 of the present invention, the distance determination unit (C11) determines a degree of the change in the relative distance based on comparison with a threshold, and the notification control unit (C12) changes the second notification output in accordance with a result of the determination.

In the straddle type vehicle (1) of arrangement 7 of the present invention, the third notification output includes at least one of display on the display unit (for example, 15) (FIG. 7), a vibration of a vibration generation unit arranged in the self-vehicle, a voice from a voice generation unit arranged in the self-vehicle, and an acceleration/deceleration vibration generated in the self-vehicle based on vehicle body control.

Advantageous Effects of Invention

According to the present invention of arrangement 1, it is possible to provide a straddle type vehicle capable of notifying a driver stepwise of the relative positional relationship with another vehicle in accordance with a driving situation.

According to the straddle type vehicle of arrangement 2, it is possible to provide an advanced notification function according to a driving situation by making the notification based on a determination result of lateral movement in the vehicle width direction.

According to the straddle type vehicle of arrangements 2 and 3, it is possible to provide an advanced notification function according to a driving situation by making the notification by the third notification output after the notification by the first notification output.

According to the straddle type vehicle of arrangement 4, it is possible to provide an advanced notification function according to a driving situation by making the notification by the third notification output after the notification by the second notification output.

According to the straddle type vehicle of arrangement 5, it is possible to change the first notification output in accordance with the type or size of the other vehicle.

According to the straddle type vehicle of arrangement 6, it is possible to change the second notification output in accordance with the degree of the change in the relative distance.

According to the straddle type vehicle of arrangement 7, it is possible to make a more effective notification by using various methods as the notification output.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

An embodiment of the present invention will now be described with reference to the accompanying drawings. Constituent elements described in this embodiment are merely examples, and are not limited by the following embodiment.

(Arrangement of Motorcycle (Straddle Type Vehicle))

Figure 1:
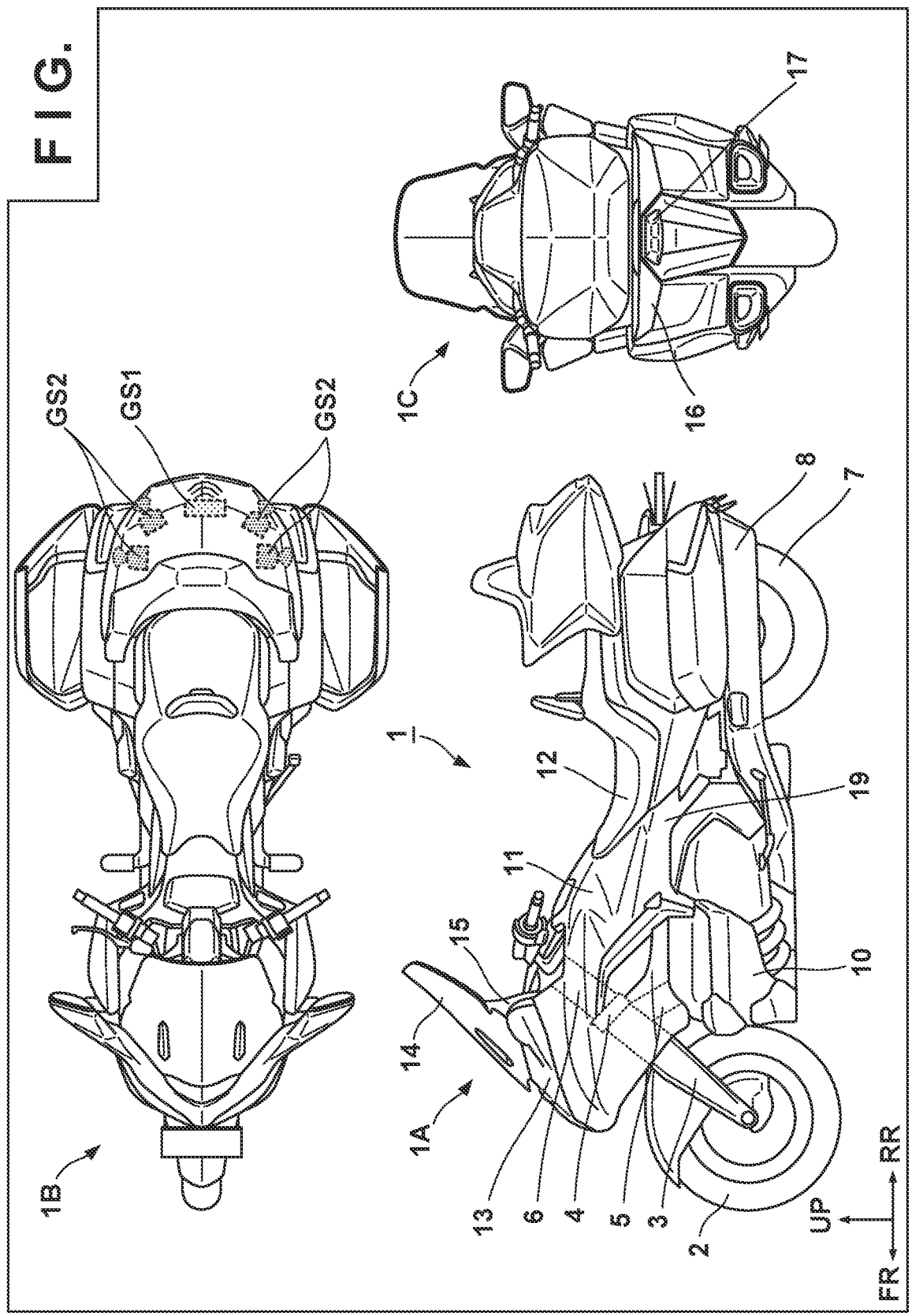
FIG. 1 is a view showing the outer appearance configuration of a motorcycle according to an embodiment.

FIG. 1 is a view showing the outer appearance configuration of a motorcycle (straddle type vehicle 1) according to the embodiment of the present invention. 1A in FIG. 1 is a left side view of the straddle type vehicle 1, 1B in FIG. 1 is a top view of the straddle type vehicle 1, and 1C in FIG. 1 is a rear view of the straddle type vehicle 1. In the straddle type vehicle 1, a front wheel 2 is axially supported by the lower end portions of a pair of left and right front forks 3. The upper portions of the left and right front forks 3 are pivotally, steerably supported by a head pipe 6 at the front end portion of a vehicle body frame 5 via a steering stem 4. A rear wheel 7 of the straddle type vehicle 1 is axially supported by the rear end portion of an arm 8 extending to the front and rear sides on the lower side of the vehicle body rear portion. The front end portion of the arm 8 is pivotally supported at the intermediate portion of the vehicle body frame 5 in the front-and-rear direction to be swingable in the vertical direction.

An engine (internal combustion engine) 10 that is the motor of the straddle type vehicle 1 is mounted on the vehicle body frame 5. A fuel tank 11 is arranged above the engine 10, and a seat 12 on which the occupant (driver) of the straddle type vehicle 1 sits is arranged on the rear side of the fuel tank 11. A front cowl 13 supported by the vehicle body frame 5 is attached to the vehicle body front portion. A screen 14 is provided on the front upper side of the front cowl 13. A display device 15 is arranged inside the front cowl 13. Reference numeral 16 denotes a tail turn signal of the straddle type vehicle 1; and 17, a tail light of the straddle type vehicle 1.

In the straddle type vehicle 1, a radar GS1 and a sonar GS2 are arranged as a detection unit (outside information detection unit GS) that detects, as outside information around the vehicle, the situation of a detection area on the rear side or a lateral side of the self-vehicle. In addition, a communication information detection unit that acquires outside information by communication in a road traffic system C-ITS may be arranged. In this embodiment, the radar GS1 is provided, for example, on the rear portion of the straddle type vehicle 1, and the sonar GS2 is provided at each of the left and right side portions or the rear corner portions of the straddle type vehicle 1.

(Functional Arrangement of Information Notification Apparatus)

Figure 2:
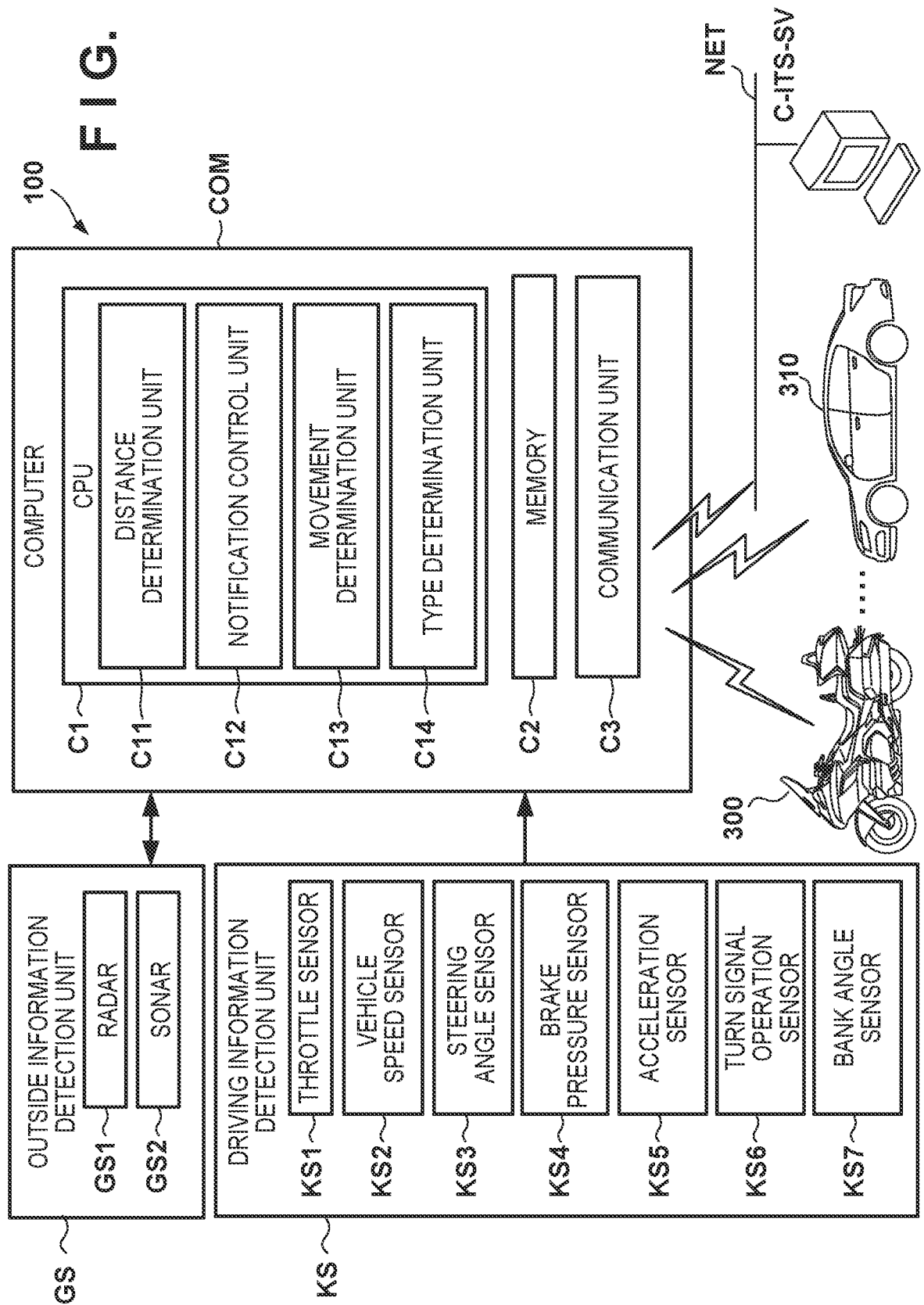
FIG. 2 is a block diagram showing the arrangement of an information notification apparatus that controls notification processing of the straddle type vehicle.

FIG. 2 is a block diagram showing the functional arrangement of an information notification apparatus 100 that controls notification processing of the straddle type vehicle 1 according to this embodiment. The information notification apparatus 100 is mounted on the straddle type vehicle 1, and controls processing of notifying the driver of detection information concerning another vehicle (peripheral vehicle) existing on the lateral side or the rear side of the straddle type vehicle 1.

The information notification apparatus 100 includes the outside information detection unit GS that acquires outside information on the lateral side or the rear side of the straddle type vehicle 1, a driving information detection unit KS that acquires information of a driving control system, and a computer COM.

The outside information detection unit GS that acquires outside information includes the radar GS1 and the sonar GS2, and pieces of detection information of the radar GS1 and the sonar GS2 are input to the computer COM.

The radar GS1 is, for example, a millimeter wave radar, which transmits a radio wave and receives the radio wave reflected by an obstacle or a vehicle on the periphery. This makes it possible to detect a peripheral vehicle on the lateral side or the rear side of the straddle type vehicle 1 and detect the relative distance or speed to the peripheral vehicle.

The sonar GS2 transmits a sound wave and receives the sound wave reflected by an obstacle or vehicle on the periphery and returned. This makes it possible to detect a peripheral vehicle on the lateral side or the rear side of the straddle type vehicle 1 and detect the relative distance or speed to the peripheral vehicle.

A communication unit C3 acquires traffic information by communication with a communication server apparatus C-ITS-SV on a network or inter-vehicle communication with a peripheral vehicle, thereby acquiring detection information of a peripheral vehicle on the lateral side or the rear side of the straddle type vehicle 1. The communication server apparatus C-ITS-SV can distribute road traffic information collected from infrastructure facilities arranged on a road. Based on the road traffic information distributed from the communication server apparatus C-ITS-SV, the communication unit C3 can detect a peripheral vehicle on the lateral side or the rear side of the straddle type vehicle 1 and acquire information concerning the relative distance or speed to the peripheral vehicle.

The driving information detection unit KS that acquires information of a driving control system includes, for example, a throttle sensor KS1, a vehicle speed sensor KS2, a steering angle sensor KS3, a brake pressure sensor KS4, an acceleration sensor KS5, a turn signal operation sensor KS6, a bank angle sensor KS7, and the like, and detection information from each sensor is input to the computer COM.

The computer COM is formed as an electronic control unit (ECU), and includes a CPU (C1) that controls processing associated with driving control of the straddle type vehicle 1, a memory C2, and the communication device C3 that is connected to a network NET, and can communicate with the communication server apparatus C-ITS-SV or vehicles 300, 310, and the like traveling on the lateral side or the rear side of the straddle type vehicle 1 (self-vehicle). The computer COM includes a fuel injection control unit, an ignition control unit, and a throttle control unit, which control the operation of the engine 10.

In addition, the computer COM performs image processing for detection information input from the outside information detection unit GS (the radar GS1 and the sonar GS2), extracts a vehicle traveling on the lateral side or the rear side of the straddle type vehicle 1, and analyzes what kind of vehicle is traveling around the straddle type vehicle 1. For example, it is possible to determine the size of a vehicle traveling on the rear side in a lane where the straddle type vehicle 1 is traveling or a vehicle traveling on the lateral side or the rear side in an adjacent lane. Based on the size of the other vehicle, it can be discriminated whether the other vehicle is a large vehicle such as a bus or a truck, a middle-size vehicle such as a minivan or a sedan-type vehicle, or a small-size vehicle including a light vehicle and a motorcycle.

The CPU (C1) of the computer COM executes a notification control program stored in the memory C2, thereby functioning as distance determination unit C11, a notification control unit C12, a movement determination unit C13, and a type determination unit C14.

The radar GS1 and the sonar GS2 of the outside information detection unit GS form a detection unit that detects the situation of a detection area on the rear side or the lateral side of the straddle type vehicle 1 (self-vehicle).

The distance determination unit C11 determines a change in the relative distance between the self-vehicle and another vehicle detected in a detection area. The notification control unit C12 makes a notification to the driver based on the detection result of the detection unit (the radar GS1 and the sonar GS2) or the determination result of the distance determination unit C11. For example, if the detection unit detects another vehicle in the detection area, the notification control unit C12 makes a notification by first notification output. If the distance determination unit C11 determines that the relative distance to another vehicle detected by the detection unit has become short, the notification control unit C12 makes a notification by second notification output. Here, the notification by the second notification output may be done after the notification of the first notification output or after the notification of third notification output to be described below.

The movement determination unit C13 can determine the movement of the self-vehicle in the vehicle width direction based on, for example, the detection result of the steering angle sensor KS3 or the bank angle sensor KS7. The notification control unit C12 makes a notification to the driver based on the determination result of the movement determination unit C13. Here, the notification based on the determination result of the movement determination unit C13 may be done after the notification of the first notification output or after the notification of second notification output.

For example, if another vehicle is detected in the detection area on the lateral side or the rear side of the self-vehicle, the notification control unit C12 can make a notification to the driver by the first notification output. If the self-vehicle is steered in the direction in which the other vehicle is detected to make a right or left turn or change the lane, the notification control unit C12 can make a notification to the driver by the third notification output. Note that in the first notification output, in addition to detection of the other vehicle, if an ON signal for a switch that operates the left turn signal or the right turn signal is detected by the turn signal operation sensor KS6, the first notification output can be performed.

Alternatively, if the relative distance between the self-vehicle and the other vehicle detected in the detection area is short, the notification control unit C12 can make a notification to the driver by the second notification output. If the self-vehicle is steered in the direction of the other vehicle of the close relative distance, the notification control unit C12 can make a notification to the driver by the third notification output.

In this way, the notification control unit C12 can make a notification stepwise in accordance with the driving state of the self-vehicle.

That is, if the self-vehicle moves in the vehicle width direction (in the direction in which the other vehicle is detected) by the determination of the movement determination unit C13 after a notification by the first notification output based on the detection result of the detection unit (the radar GS1 and the sonar GS2) and before a notification by the second notification output based on the determination result of the distance determination unit C11, the notification control unit C12 can make a notification by the third notification output. Alternatively, if the self-vehicle moves in the vehicle width direction (in the direction of the other vehicle of the close relative distance) by the determination of the movement determination unit C13 after a notification by the second notification output based on the determination result of the distance determination unit C11, the notification control unit C12 can make a notification by the third notification output.

(Procedure of Notification Processing)

Figure 3:
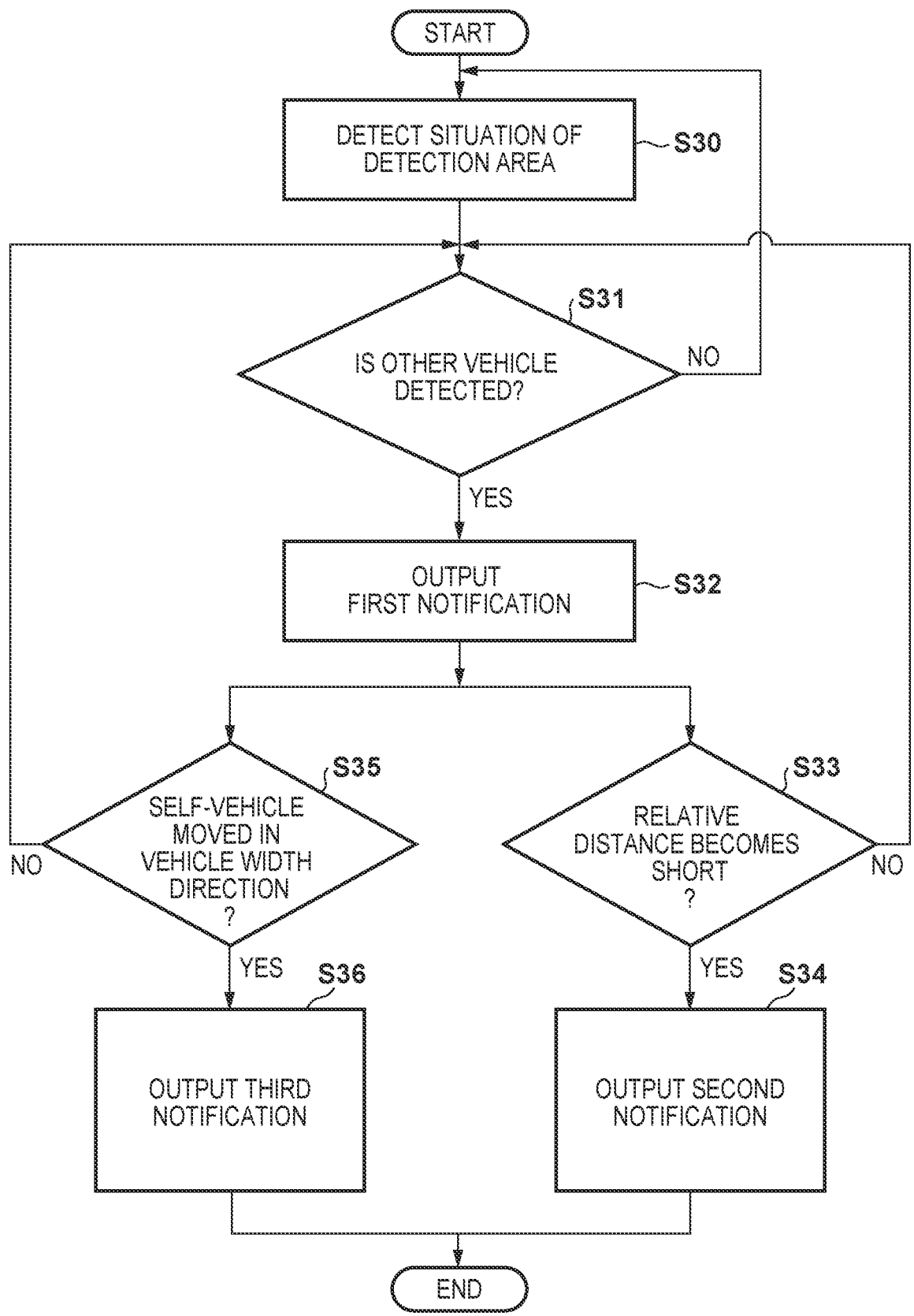
FIG. 3 is a flowchart for explaining the procedure of notification processing by a notification control unit.

FIG. 3 is a flowchart for explaining the procedure of notification processing by the notification control unit C12. In step S30, the detection unit (the radar GS1 and the sonar GS2) detects the situation of the detection area on the rear side or the lateral side of the straddle type vehicle 1.

In step S31, the computer COM performs image processing for the detection information input from the detection unit (the radar GS1 and the sonar GS2), and analyzes whether another vehicle is traveling in the detection area. If no other vehicle is detected in the determination of step S31 (NO in step S31), the process returns to step S30, and the detection unit continues detection of the detection area. On the other hand, if another vehicle is detected in the detection area on the rear side or the lateral side in the determination of step S31 (YES in step S31), the process advances to step S32.

In step S32, if another vehicle is detected in the detection area by the detection unit, the notification control unit C12 makes a notification by first notification output. The detailed processing procedure of the first notification output in steps S31 and S32 will be described with reference to FIG. 4. Note that in this step, in addition to detection of the other vehicle, if an ON signal for a switch that operates the left turn signal or the right turn signal is detected by the turn signal operation sensor KS6, a notification may be made by the first notification output.

After the notification by the first notification output, the notification control unit C12 executes processing from step S33 and processing from step S35 in parallel.

In step S33, the distance determination unit C11 determines a change in the relative distance between the self-vehicle and the other vehicle detected in the detection area. For example, the distance determination unit C11 stores the relative distance to the other vehicle, acquires the relative distance every time a predetermined time elapses, and determines whether the relative distance has changed along with the elapse of time. If the relative distance between the self-vehicle and the other vehicle detected in the detection area has not changed, or the relative distance has become long (NO in step S33), the process returns to step S31. If another vehicle is detected in the detection area (YES in step S31), the notification control unit C12 continuously performs the notification by the first notification output (step S32).

On the other hand, if the relative distance between the other vehicle and the self-vehicle has become short in the determination of step S33 (YES in step S33), the process advances to step S34. If the distance determination unit C11 determines that the relative distance to the other vehicle has become short, in step S34, the notification control unit C12 makes a notification by the second notification output. The detailed processing procedure of the second notification output in steps S33 and S34 will be described with reference to FIG. 5.

Additionally, in step S35, the movement determination unit C13 determines the presence/absence of movement (lateral movement) of the self-vehicle in the vehicle width direction (in the direction in which the other vehicle is detected) based on the detection result of the steering angle sensor KS3 or the bank angle sensor KS7. If the self-vehicle has not made lateral movement in the vehicle width direction, that is, if the self-vehicle is not steered in the direction in which the other vehicle is detected (NO in step S35), the process returns to step S31. If another vehicle is detected in the detection area (YES in step S31), the notification control unit C12 continuously performs the notification by the first notification output (step S32).

On the other hand, if the self-vehicle has made lateral movement in the vehicle width direction in the determination of step S35, that is, if the self-vehicle is steered in the direction in which the other vehicle is detected (YES in step S35), the process advances to step S36. If the self-vehicle moves in the vehicle width direction (in the direction in which the other vehicle is detected) by the determination of the movement determination unit C13, in step S36, the notification control unit C12 makes a notification by the third notification output. The detailed processing procedure of the third notification output in steps S35 and S36 will be described with reference to FIG. 6.

Note that in the procedure shown in FIG. 3, after the processing of step S34, processing similar to steps S35 and S36 may further be executed. In this case, as for the output order of notification outputs, the notifications are made stepwise in the order of the first notification output, the second notification output, and the third notification output.

Additionally, in the procedure shown in FIG. 3, after the processing of step S36, processing similar to steps S33 and S34 may further be executed. In this case, as for the output order of notification outputs, the notifications are made stepwise in the order of the first notification output, the third notification output, and the second notification output.

It is therefore possible to provide an advanced notification function by notifying the driver stepwise of the relative positional relationship with another vehicle in accordance with a driving situation.

(Processing of First Notification Output)

Figure 4:
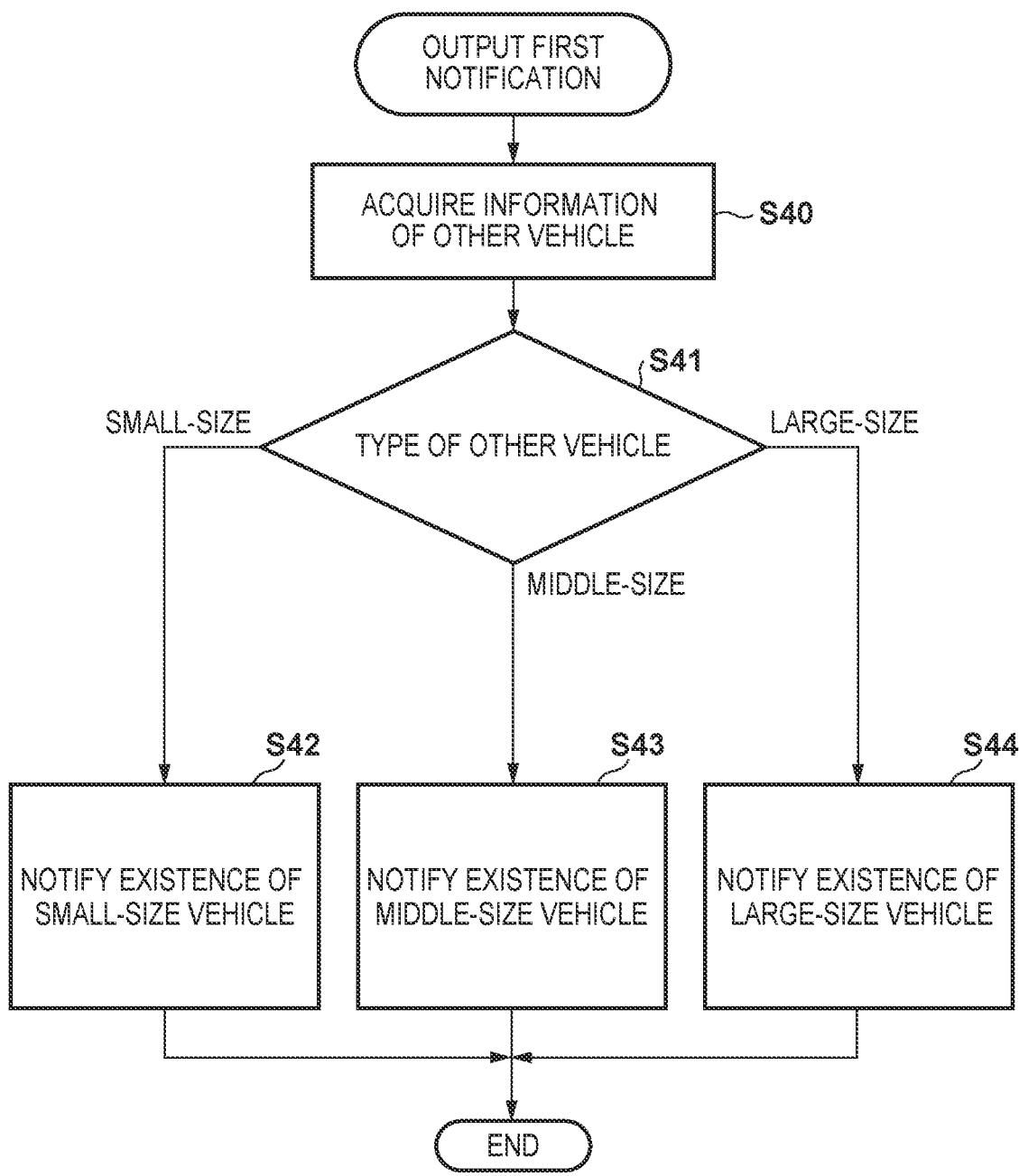
FIG. 4 is a flowchart for explaining the detailed processing procedure of first notification output.

FIG. 4 is a flowchart for explaining the detailed processing procedure of first notification output in steps S31 and S32 of FIG. 3.

First, in step S40, the computer COM acquires the size information of another vehicle concerning the vehicle height and the vehicle width of the other vehicle by image processing for detection information input from the detection unit. In step S41, the type determination unit C14 determines the type (size) of the other vehicle based on the size information acquired from the detection result of the detection unit. For example, the type determination unit C14 compares the size information with type threshold information (a first type threshold and a second type threshold representing a large size as compared to the first type threshold) used to determine the type (size) of the vehicle, thereby determining the type of the other vehicle. The notification control unit C12 changes the first notification output in accordance with the determination result of the type determination unit C14. If the size information is smaller than the first type threshold, the type determination unit C14 determines that the other vehicle is a small-size vehicle. If the size information is equal to or larger than the first type threshold and smaller than the second type threshold, the type determination unit C14 determines that the other vehicle is a middle-size vehicle. If the size information is equal to or larger than the second type threshold, the type determination unit C14 determines that the other vehicle is a large-size vehicle.

If the other vehicle is a small-size vehicle, in step S42, the notification control unit C12 changes the first notification output to notify the existence of the small-size vehicle. If the other vehicle is a middle-size vehicle, in step S43, the notification control unit C12 changes the first notification output to notify the existence of the middle-size vehicle. If the other vehicle is a large-size vehicle, in step S44, the notification control unit C12 changes the first notification output to notify the existence of the large-size vehicle.

This can change the first notification output in accordance with the type or size of the other vehicle.

(Change Processing of Second Notification Output)

Figure 5:
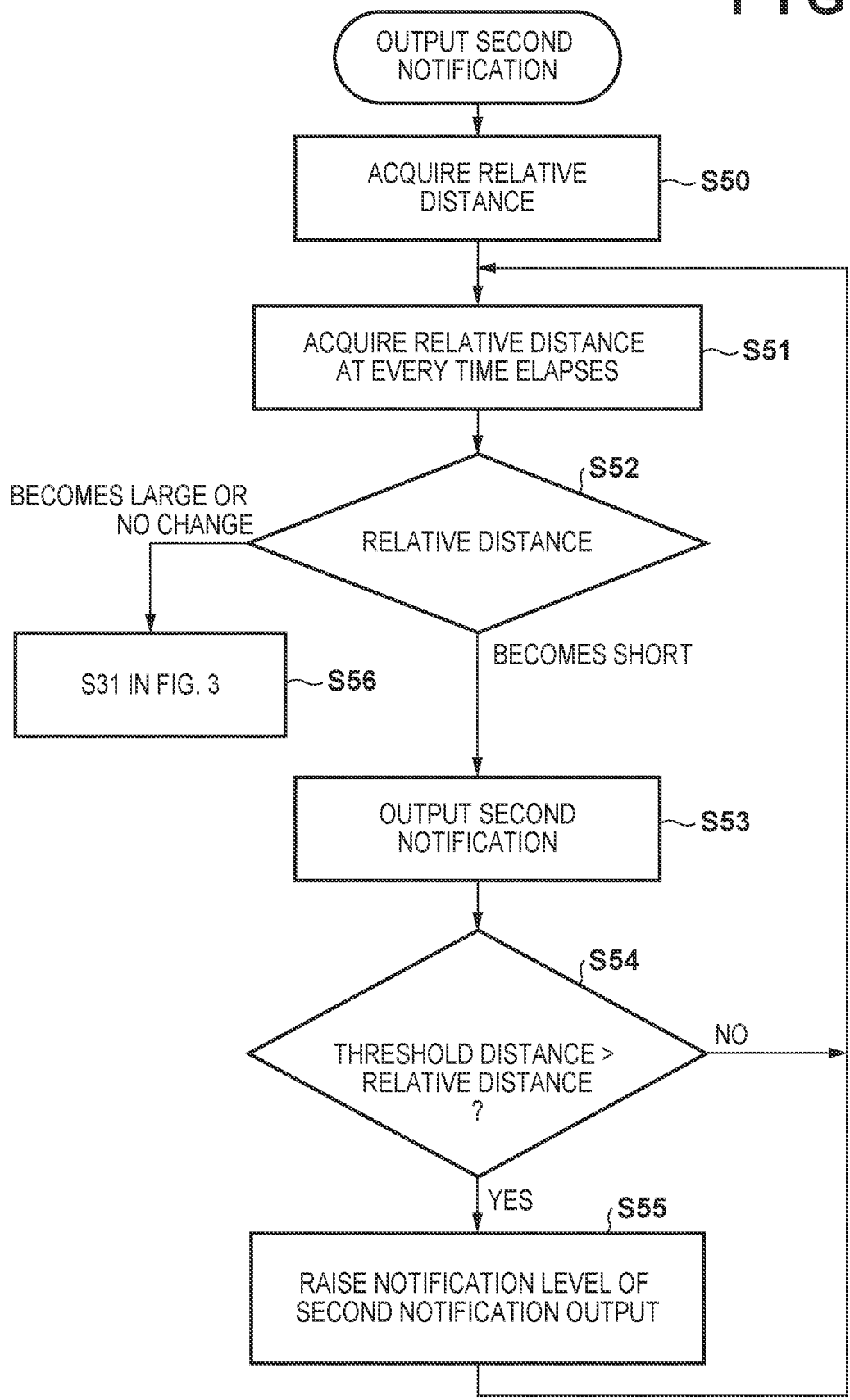
FIG. 5 is a flowchart for explaining the detailed processing procedure of second notification output.

FIG. 5 is a flowchart for explaining the detailed processing procedure of second notification output in steps S33 and S34 of FIG. 3.

First, in step S50, the distance determination unit C11 acquires the relative distance between the self-vehicle and another vehicle detected in the detection area. Here, the relative distance to another vehicle detected for the first time in the detection area is set to the initial value.

In step S51, the distance determination unit C11 acquires the relative distance to the other vehicle every time a predetermined time elapses. For example, the distance determination unit C11 acquires the relative distance between the other vehicle and the self-vehicle at the interval of a predetermined time ΔT.

In step S52, the distance determination unit C11 determines a change in the relative distance. For example, if the relative distance acquired at a time T=T0+ΔT is large or remains unchanged as compared to the relative distance of the initial value acquired at the time T=T0, the process returns to step S31 of FIG. 3 (step S56).

On the other hand, if the relative distance has become short, that is, if the relative distance between the self-vehicle and the other vehicle has become short in the determination of step S52, the process advances to step S53.

In step S53, the notification control unit C12 makes a notification by the second notification output. In step S54, the distance determination unit C11 compares the relative distance with a threshold distance. If the relative distance is smaller than the threshold distance, that is, if the relative distance is shorter than the threshold distance, the process advances to step S55.

The threshold distance is a distance serving as a determination criterion for raising the notification level of second notification output. In this example, an example in which one threshold distance is used is shown. However, a plurality of threshold distances may be stored in the memory C2 in advance, and the relative distance and the threshold distance may be compared stepwise. If the relative distance gradually becomes short beyond each threshold distance, that is, if the self-vehicle and the other vehicle are approaching, the process advances to step S55.

In step S55, the notification control unit C12 further raises the notification level of the second notification output. If the relative distance becomes short as compared to the threshold distance, the notification control unit C12 raises the notification level of the second notification output. If the relative distance gradually becomes short beyond a plurality of threshold distances, that is, if the self-vehicle and the other vehicle are approaching, the notification control unit C12 raises the notification level of the second notification output. The process returns to step S51, and the notification control unit C12 repetitively executes similar processing.

This can change the second notification output in accordance with the degree of the change in the relative distance.

(Processing of Third Notification Output)

Figure 6:
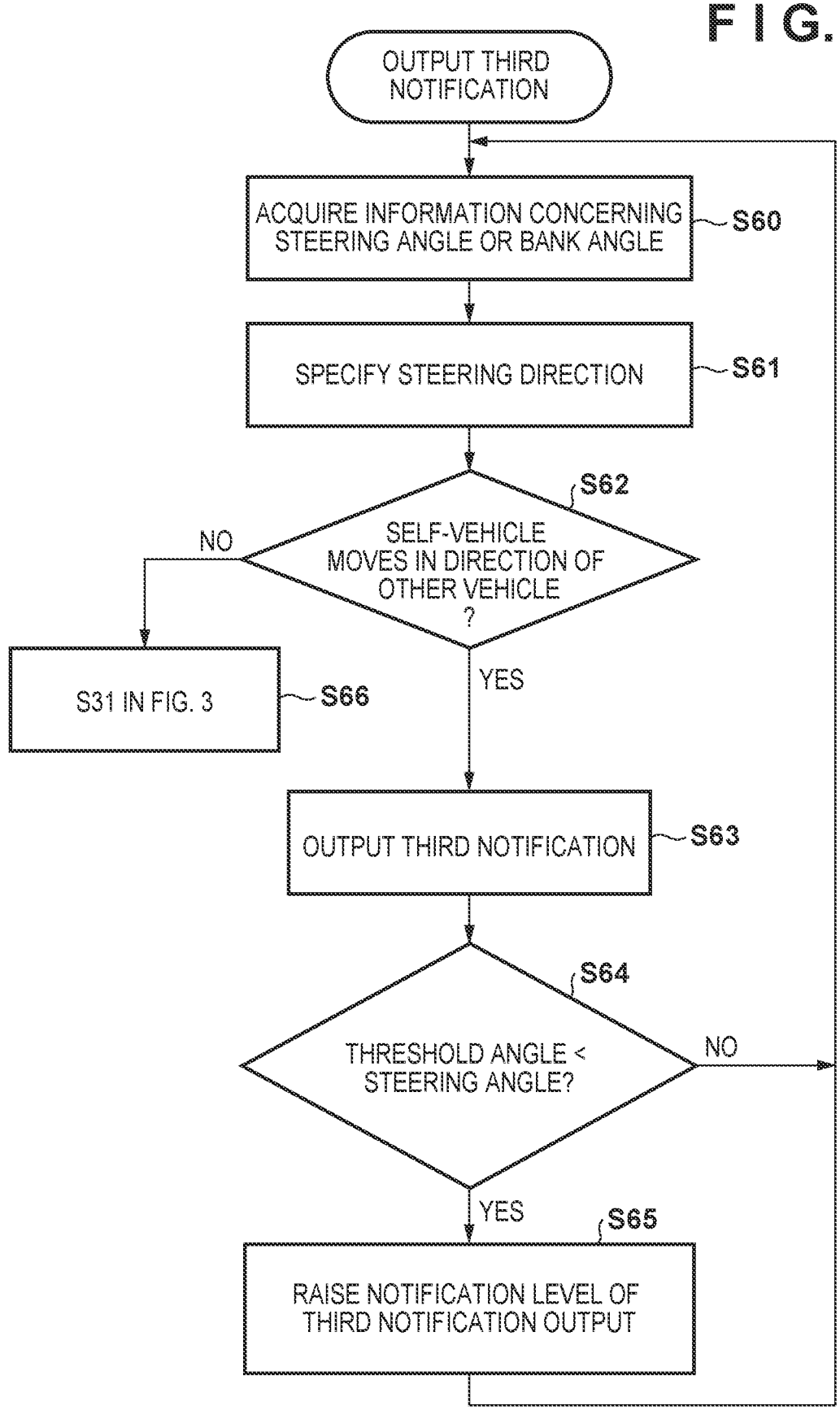
FIG. 6 is a flowchart for explaining the detailed processing procedure of third notification output.

FIG. 6 is a flowchart for explaining the detailed processing procedure of third notification output in steps S35 and S36 of FIG. 3.

In step S60, the movement determination unit C13 acquires information concerning the steering angle of the self-vehicle or information concerning the bank angle based on the detection result of the steering angle sensor KS3 or the bank angle sensor KS7. For example, the steering angle sensor KS3 detects the steering angle of the self-vehicle, and the bank angle sensor KS7 is formed by, for example, a gyro sensor or an acceleration sensor and detects the tilt angle (bank angle) of the self-vehicle in the left-and-right direction. Here, the bank angle when the self-vehicle is in a vertical state is defined as 0°. Based on this angle, a bank angle tilting in the left-and-right direction is detected.

In step S61, the movement determination unit C13 specifies the steering direction of the self-vehicle based on the steering angle acquired from the steering angle sensor KS3 or the bank angle acquired from the bank angle sensor KS7.

In step S62, the movement determination unit C13 determines whether the steering direction of the self-vehicle is the direction in which the other vehicle is detected. For example, if the self-vehicle moves in the rightward direction in a state in which the other vehicle is detected in the detection area on the right side, the movement determination unit C13 determines that the self-vehicle moves in the direction of the other vehicle. If the self-vehicle moves in the rightward direction in a state in which the other vehicle is detected in the detection area on the left side, the movement determination unit C13 determines that the self-vehicle does not move in the direction of the other vehicle. If the movement determination unit C13 determines that the self-vehicle does not move in the direction of the other vehicle in the determination of step S62 (NO in step S62), the process returns to step S31 of FIG. 3 (step S66).

On the other hand, if the movement determination unit C13 determines that the self-vehicle moves in the direction of the other vehicle in the determination of step S62 (YES in step S62), the process advances to step S63.

In step S63, the notification control unit C12 makes a notification by the third notification output. In step S64, the movement determination unit C13 compares the steering angle detected by the steering angle sensor KS3 with a threshold angle. If the steering angle is larger than the threshold angle, that is, if the self-vehicle is steered in the direction of the other vehicle at a steering angle larger than the threshold angle, the process advances to step S65. Note that in step S64, the movement determination unit C13 may compare the bank angle detected by the bank angle sensor KS7 with a threshold bank angle, and if the bank angle is larger than the threshold bank angle, that is, if the self-vehicle is steered in the direction of the other vehicle at a bank angle larger than the threshold bank angle, the process may advance to step S65.

The threshold angle is an angle serving as a determination criterion for raising the notification level of third notification output. In this example, an example in which one threshold angle is used is shown. However, a plurality of threshold angles may be stored in the memory C2 in advance, and the steering angle and the threshold angle may be compared stepwise. If the steering angle gradually becomes large beyond each threshold angle, that is, if the self-vehicle is moving toward the direction of the other vehicle, the process advances to step S65.

In step S65, the notification control unit C12 further raises the notification level of the third notification output. If the steering angle is larger than the threshold angle, the notification control unit C12 raises the notification level of the third notification output. If the steering angle gradually becomes large beyond a plurality of threshold angles, that is, if the self-vehicle is moving toward the direction of the other vehicle, the notification control unit C12 raises the notification level of the third notification output. The process returns to step S60, and the notification control unit C12 repetitively executes similar processing.

This can change the third notification output in accordance with the degree of the change in the steering angle if the self-vehicle is moving toward the direction of the other vehicle.

(Detailed Examples of Notifications)

The notification control unit C12 causes, for example, the display unit 15 to display the first notification output, the second notification output, and the third notification output, thereby making a notification via the sight of the driver.

Figure 7:
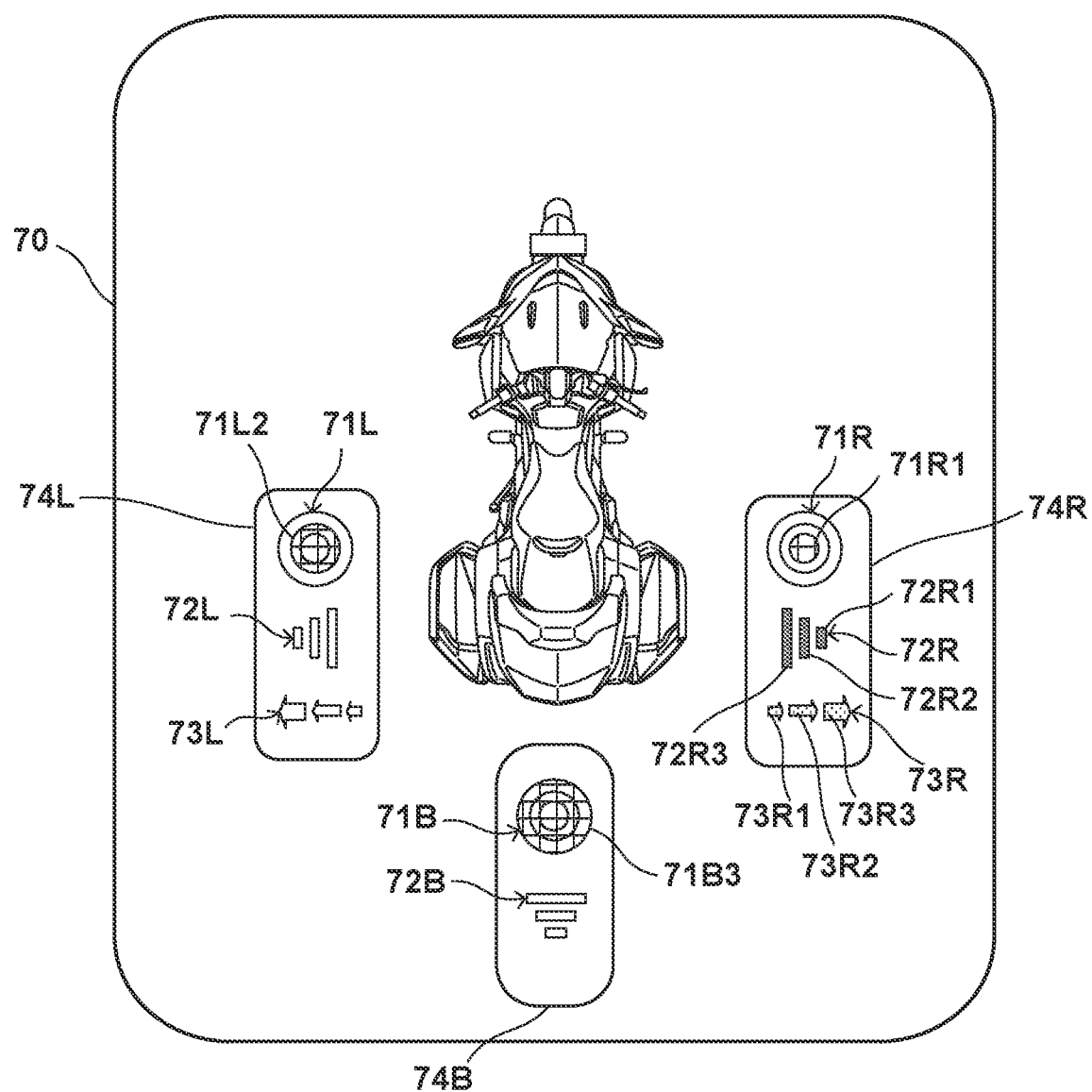
FIG. 7 is a view showing an example of display of the first notification output, the second notification output, and the third notification output by display control of the notification control unit.

FIG. 7 is a view showing an example of display of the first notification output, the second notification output, and the third notification output by display control of the notification control unit C12. The display unit 15 is configured to display a notification display region 70 together with a vehicle speed meter and a tachometer.

In a notification display region 74L on the left side of the self-vehicle, a display portion 71L of first notification output, a display portion 72L of second notification output, and a display portion 73L of third notification output are arranged.

In a notification display region 74R on the right side of the self-vehicle, a display portion 71R of first notification output, a display portion 72R of second notification output, and a display portion 73R of third notification output are arranged. Additionally, in a notification display region 74B on the rear side of the self-vehicle, a display portion 71B of first notification output and a display portion 72B of second notification output are arranged.

Each of the display portions 71L, 71R, and 71B of the first notification output is formed by, for example, three indicators that are arranged concentrically. The notification control unit C12 can control the display of the indicators in accordance with the type (size) of another vehicle detected in the detection area. For example, if a small-size vehicle is detected, the notification control unit C12 lights the innermost indicator (for example, 71R1) of the three indicators. If a middle-size vehicle is detected, the notification control unit C12 additionally lights the intermediate indicator (for example, 71L2) of the three indicators. If a large-size vehicle is detected, the notification control unit C12 further additionally lights the outermost indicator (for example, 71B3) of the three indicators.

In the display example shown in FIG. 7, the light emission area of the display portion is changed in accordance with the type (size) of the other vehicle, thereby notifying the existence of the other vehicle detected in the detection area. Additionally, the display color or brightness of the display portion or the light emission period of the display portion may be changed in accordance with the type (size) of the other vehicle.

Each of the display portions 72L, 72R, and 72B of the second notification output is formed by, for example, three indicators that are arranged like scale divisions. The notification control unit C12 can control the display of the indicators in accordance with the relative distance to another vehicle detected in the detection area. For example, if a first decrease in the relative distance is detected, the notification control unit C12 lights the indicator (for example, 72R1) of the smallest scale division in the three indicators. If a further decrease in the relative distance is detected, the notification control unit C12 additionally lights the indicator (for example, 72R2) of the intermediate scale division in the three indicators. If a further decrease in the relative distance is detected, the notification control unit C12 additionally lights the indicator (for example, 72R3) of the largest scale division in the three indicators.

In the display example shown in FIG. 7, the light emission area of the display portion is changed, thereby notifying the degree of the decrease in the relative distance. Additionally, the display color or brightness of the display portion or the light emission period of the display portion may be changed in accordance with the degree of the decrease in the relative distance.

Each of the display portions 73L and 73R of the third notification output is formed by, for example, three indicators that are arranged in arrow shapes corresponding to a moving direction. The notification control unit C12 can control the display of the indicators in accordance with the magnitude of the steering angle. For example, if the self-vehicle is steered in the direction in which the other vehicle is detected, the notification control unit C12 lights the indicator (for example, 73R1) of the smallest arrow in the three indicators. If the self-vehicle is further steered in the direction in which the other vehicle is detected, the notification control unit C12 additionally lights the indicator (for example, 73R2) of the intermediate arrow in the three indicators. If further steering in the direction of the other vehicle is detected, the notification control unit C12 additionally lights the indicator (for example, 73R3) of the largest arrow in the three indicators.

In the display example shown in FIG. 7, if the self-vehicle moves in the direction in which the other vehicle is detected, the light emission area of the display portion is changed, thereby notifying the degree of the change in the steering angle. Additionally, the display color or brightness of the display portion or the light emission period of the display portion may be changed in accordance with the degree of the change in the steering angle.

FIG. 7 shows an example which the first notification output, the second notification output, and the third notification output are display on the display unit 15 and notified. A vibration generation unit may be incorporated in the arrangement of the straddle type vehicle 1, and the notification control unit C12 may cause the vibration generation unit to vibrate to make a notification to the driver. For example, when the vibration generation units are arranged in the turn signal operator of the straddle type vehicle 1, the fuel tank 11, the seat 12, a step on which the occupant (driver) of the straddle type vehicle 1 can place a foot, and a helmet worn by the occupant (driver), the notification control unit C12 can output a notification control signal to the vibration generation units by wired communication or short-distance wireless communication to generate a vibration. The degree of a notification can be changed by changing the amplitude of the vibration (the strength of the vibration) or the period of the vibration.

In addition, a speaker (voice generation unit) may be arranged in the display unit 15 of the straddle type vehicle 1 or a helmet worn by the occupant (driver), and the notification control unit C12 may output a voice output based on a voice notification signal from the speaker (voice generation unit) by wired communication or short-distance wireless communication to make a notification. The degree of a notification can be changed by changing the volume or the output period of the voice notification signal.

Additionally, the notification control unit C12 can also make a notification to the driver by controlling the fuel cut or brake pressure (vehicle control) to cause the straddle type vehicle 1 to generate a weak acceleration/deceleration vibration. The degree of a notification can be changed by changing the strength of the acceleration/deceleration vibration or the acceleration/deceleration pattern (period) by vehicle control.

The first notification output, the second notification, and the third notification output, which are output based on control of the notification control unit C12, include at least one of, for example, display on the display unit 15 shown in FIG. 7, a vibration of the vibration generation unit arranged in the straddle type vehicle 1, a voice from the voice generation unit arranged in the straddle type vehicle 1, and an acceleration/deceleration vibration generated in the straddle type vehicle 1 based on vehicle body control, and a notification can be made by these to the driver.

The present invention is not limited to the above embodiments and various changes and modifications can be made within the spirit and scope of the present invention. Therefore, to apprise the public of the scope of the present invention, the following claims are made.

What is claimed is:

1. A straddle riding vehicle comprising:
a detection unit (GS1, GS2) configured to detect a situation of a detection area on one of a rear side and a lateral side of a self-vehicle;
a distance determination unit (C11) configured to determine a change in a relative distance between the self-vehicle and another vehicle detected in the detection area;
a notification control unit (C12) configured to make a notification to a driver based on one of a detection result of the detection unit (GS1, GS2) and a determination result of the distance determination unit (C11);
a movement determination unit (C13) configured to determine movement of the self-vehicle in a vehicle width direction; and
a display unit (15) configured to display a notification output of the notification control unit (C12),
wherein the notification control unit (C12)
makes the notification by first notification output if the other vehicle is detected in the detection area by the detection unit (GS1, GS2),
makes the notification by second notification output if it is determined by the distance determination unit (C11) that the relative distance to the other vehicle has become short, and
makes the notification by third notification output if the self-vehicle moves in the vehicle width direction by determination of the movement determination unit (C13),
the display unit (15) includes a plurality of notification display regions (74L, 74R, 74B) in which display portions (71L, 71R, 71B) of the first notification output, display portions (72L, 72R, 72B) of the second notification output, and display portions (73L, 73R) of the third notification output are arranged, and
each of the plurality of notification display regions (74L, 74R, 74B) is arranged at a position representing a detection area on one of the rear side and the lateral side of the self-vehicle,
wherein the display portions (71L, 71R, 71B) of the first notification output, the display portions (72L, 72R, 72B) of the second notification output, and the display portions (73L, 73R) of the third notification output each have different display forms, and
the notification control unit (C12) is configured to make the notification to the driver by the first notification output and the second notification output and the third notification output each having different display forms.

2. The straddle riding vehicle according to claim 1, wherein the notification control unit (C12) further makes the notification based on a determination result of the movement determination unit (C13).

3. The straddle riding vehicle according to claim 2, wherein the notification control unit (C12) makes the notification by the third notification output if the self-vehicle moves in the vehicle width direction by the determination of the movement determination unit (C13) after the notification by the first notification output and before the notification by the second notification output.

4. The straddle riding vehicle according to claim 3, wherein the third notification output includes at least one of display on the display unit (15), a vibration of a vibration generation unit arranged in the self-vehicle, a voice from a voice generation unit arranged in the self-vehicle, and an acceleration/deceleration vibration generated in the self-vehicle based on vehicle body control.

5. The straddle riding vehicle according to claim 2, wherein the notification control unit (C12) makes the notification by the third notification output if the self-vehicle moves in the vehicle width direction by the determination of the movement determination unit (C13) after the notification by the second notification output.

6. The straddle riding vehicle according to claim 1, further comprising a type determination unit (C14) configured to determine a type of the other vehicle based on the detection result of the detection unit (GS1, GS2),
wherein the notification control unit (C12) changes the first notification output in accordance with a determination result of the type determination unit (C14).

7. The straddle riding vehicle according to claim 1, wherein the distance determination unit (C11) determines a degree of the change in the relative distance based on comparison with a threshold, and the notification control unit (C12) changes the second notification output in accordance with a result of the determination.

* * * * *